United States Patent [19]

Sawyer et al.

[11] 4,430,442

[45] Feb. 7, 1984

[54] CATALYSTS FROM MOLYBDENUM POLYSULFIDE PRECURSORS AND THEIR PREPARATION

[75] Inventors: Willard H. Sawyer; Howard L. Mitchell, III, both of Baton Rouge, La.

[73] Assignee: Exxon Research and Engineering Co., Florham Park, N.J.

[21] Appl. No.: 399,947

[22] Filed: Jul. 20, 1982

[51] Int. Cl.$^3$ ............ B01J 27/02; B01J 31/12; B01J 27/24

[52] U.S. Cl. ................ 502/220; 502/222; 502/162; 502/164; 502/200; 423/56

[58] Field of Search ............ 252/431 N, 438, 439; 423/56

[56] References Cited

U.S. PATENT DOCUMENTS

| | | | |
|---|---|---|---|
| 2,112,292 | 3/1938 | Jones | 423/53 X |
| 2,490,488 | 12/1949 | Stewart | 260/449.6 |
| 2,686,763 | 8/1954 | Johnson et al. | 252/439 X |
| 3,434,965 | 3/1969 | Joffe | 252/439 X |
| 3,876,755 | 4/1975 | Kurtak et al. | 423/56 |
| 3,997,473 | 12/1976 | Schmitt et al. | 252/439 |
| 4,066,530 | 1/1978 | Aldridge et al. | 208/112 |
| 4,098,839 | 7/1948 | Wilms et al. | 252/439 X |
| 4,111,796 | 9/1978 | Yanik et al. | 252/439 X |
| 4,134,825 | 1/1979 | Bearden et al. | 208/108 |
| 4,243,553 | 1/1981 | Naumann et al. | 252/439 |
| 4,243,554 | 1/1981 | Naumann et al. | 252/438 X |
| 4,303,634 | 12/1981 | Gatsir | 252/439 X |
| 4,368,141 | 1/1983 | Kuker | 252/439 |

FOREIGN PATENT DOCUMENTS

| | | | |
|---|---|---|---|
| 1473900 | 3/1967 | France | 252/439 |
| 7510059 | 3/1976 | Netherlands | 252/439 |
| 7603197 | 9/1976 | Netherlands | 252/439 |

OTHER PUBLICATIONS

Thermal Decomposition of $(NH_4)_2MoO_2S_2$, T. P. Prasad et al., J. Eng. Chem., 1973 vol. 35, pp. 1845–1904.
Mills & Steffgen, Cat. Rev. 8, 159 (1973).
Noble Metals, Mo & W in Hydrocarbon Synthesis, J. F. Shultz et al., Report 6947, Jul. 1967.
Angrew, Chem. Int. Ed. Engl. 17,279 (1978).

Primary Examiner—William G. Wright
Attorney, Agent, or Firm—Llewellyn A. Proctor

[57] ABSTRACT

A process for the preparation of novel highly active, highly selective hydrotreating catalysts. These catalysts are prepared, in bulk or in supported form, by contacting together and decomposing, in the presence of hydrogen, hydrocarbon, and sulfur, a catalyst precursor characterized by the formula Bhd x[Mo$_3$S$_z$] where B is an ammonium ion, polyammonium ion, tertiary or quaternary phosphonium ion, or a hydrocarbyl substituted ammonium ion, hydrocarbyl substituted polyammonium ion, or hydrocarbyl substituted tertiary or quaternary phosphonium ion, x is 1 where B is a divalent cationic moiety, or 2 where B is a monovalent cationic moiety, [Mo$_3$S$_z$] is a divalent anionic moiety wherein z is an integer ranging from about 10 to about 46. A preferred precursor catalyst species is Mo$_3$(S$_2$)$_6$S.

20 Claims, No Drawings

CATALYSTS FROM MOLYBDENUM POLYSULFIDE PRECURSORS AND THEIR PREPARATION

BACKGROUND OF THE INVENTION (1) Field of the Invention

This invention relates to a process for the preparation of catalysts from molybdenum polysulfide precursors, and to the use of such catalysts in hydrotreating. In particular, it relates to a process for the preparation of a species of highly active, highly selective, hydrotreating catalysts from molybdenum polysulfide catalyst precursors characterized as ammonium, or substituted ammonium tri-molybdenum polysulfide trimers, and the use of such catalysts in hydrotreating processes.

(2) Background and Prior Art

Hydrotreating processes are basic, and very well known to the petroleum refining industry. These processes require the treating with hydrogen of various hydrocarbon fractions, or whole heavy feeds, or feedstocks, in the presence of hydrogenation (hydrogen transfer) catalysts to effect conversion of at least a portion of the feeds, or feedstocks to lower molecular weight hydrocarbons, or to effect the removal of unwanted components, or compounds, or their conversion to innocuous or less undesirable compounds. Hydrotreating may be applied to a variety of feedstocks, e.g., solvents, light, middle, or heavy distillate feeds and residual feeds, or fuels. In hydrofining relatively light feeds, the feeds are treated with hydrogen, often to improve odor, color, stability, combustion characteristics, and the like. Unsaturated hydrocarbons are hydrogenated, and saturated. Sulfur and nitrogen are removed in such treatments. In the treatment of catalytic cracking feedstocks, the cracking quality of the feedstock is improved by the hydrogenation. Carbon yield is reduced, and gasoline yield is generally increased. In the hydrodesulfurization of heavier feedstocks, or residuas, the sulfur compounds are hydrogenated, and cracked. Carbon-sulfur bonds are broken, and the sulfur for the most part is converted to hydrogen sulfide which is removed as a gas from the process. Hydrodenitrogenation, to some degree also generally accompanies hydrode-sulfurization reactions. In the hydrodenitrogenation of heavier feedstocks, or residuas, the nitrogen compounds are hydrogenated and cracked. Carbon-nitrogen bonds are broken and the nitrogen is converted to ammonia and evolved from the process. Hydrodesulfurization, to some degree also generally accompanies hydrodenitrogenation reactions. In the hydrodesulfurization of relatively heavy feedstocks, emphasis is on the removal of sulfur from the feedstock which is usually converted to low molecular weight, or lower boiling components. In the hydrodenitrogenation of relatively heavy feedstocks emphasis is on the removal of nitrogen from the feedstock, which also is converted to lower molecular weight, or lower boiling components. Albeit, hydrodesulfurization and hydrodenitrogenation reactions generally occur together, it is usually far more difficult to achieve effective hydrodenitrogenation of feedstocks than hydrodesulfurization of feedstocks.

The dwindling supplies of high grade petroleum feedstocks necessitates the increased production and processing of transportation fuels from lower grade, heavy petroleum feedstocks and synthetic liquid hydrocarbons derived from hydrocarbon-containing, or precursor hydrocarbon-containing, solids. The refiners feedstock sources as a result thereof continues to change, particularly as the worldwide supplies of petroleum diminish. The newer feedstocks often contain higher amounts of nitrogen, sulfur, and other materials. Nonetheless, whatever the difficulties, it remains a necessity to effectively hydrotreat the new feedstocks; often to a greater extent than previously was required. It has thus become necessary to process whole heavy petroleum crudes and residua from unconventional sources, as well as synthetic fuels (syncrudes; e.g., liquified coal, or coal from coal carbonization, oil from tar sands, shale oil and the like inclusive of residua or viscous syncrude fractions). All, particularly the later, are under active consideration as commercial feedstocks, or feedstock replacements for higher grade petroleum sources. Feedstocks derived from these sources are often of high olefinic content, contain more sulfur or nitrogen, or both, than feedstocks derived from more conventional crude oils.

Naphthas, notably those derived from syncrudes, viz., residua, shale oil, and coal, are highly unsaturated and contain considerably more sulfur, nitrogen, olefins, and condensed ring compounds than the more conventional naphthas. For example, nitrogen and sulfur are contained in cat naphtha in concentrations ranging upwardly from 50 ppm and 1000 ppm, respectively. In coal liquids nitrogen and sulfur are present in concentrations ranging upwardly from 1300 ppm and 5000 ppm, respectively; and oxygen is present in even higher concentrations. These compounds cause activity suppression and an all too rapid deactivation of the catalysts. Coke formation is increased, and there is more cracking with increased gas production. Albeit these compounds, except for condensed ring naphthenic compounds, can be removed by conventional hydrofining, this is a severe, if not an intolerable process burden due to the large hydrogen consumption; and hydrogen becomes more and more a very expensive commodity. Thus, generally considerably more upgrading is required to obtain usable products from these sources. Such upgrading generally necessitates hydrotreating the various hydrocarbon fractions, or whole crudes, and includes reactions such as hydrogenating to saturate olefins and aromatics, hydrodesulfurizing to remove sulfur compounds, hydrodenitrogenating to remove nitrogen, and conversion of high boiling compounds to lower boiling compounds.

Typical hydrotreating catalysts are exemplified by sulfided cobalt molybdate on alumina, nickel molybdate on alumina, cobalt molybdate promoted with nickel, and the like. Certain transition metal sulfides such as cobalt and molybdenum sulfides and mixtures thereof have also been employed in hydrofining processes for upgrading oils which contain sulfur and nitrogen compounds. For example, U.S. Pat. No. 2,914,462 discloses the use of molybdenum sulfide for hydrodesulfurizing gas oil and U.S. Pat. No. 3,148,135 discloses the use of molybdenum sulfide for hydrorefining sulfur and nitrogen-containing hydrocarbon oil. U.S. Pat. No. 2,715,603 discloses the use of molybdenum sulfide as a catalyst for the hydrogenation of heavy oils, while U.S. Pat. No. 3,704,783 discloses the use of molybdenum sulfides for producing sulfur-free hydrogen and carbon dioxide, wherein the molybdenum sulfide converts carbonyl sulfide to hydrogen sulfide. A serious disadvantage associated with the use of such catalysts is their relatively high cost, and the supply of catalytic metals is rather limited. Moreover, the reaction rates of such catalysts are relatively slow, particularly in the presence of nitrogen; and hydrogen consumption is quite high. These latter problems are particularly oppressive when it is realized that new generation feeds are unusually high in nitrogen, or sulfur, or both, and the cost of hydrogen is increasing at very high rates.

Molybdenum sulfide is also known to be useful for water gas shift and methanation reactions, as well as for catalyzed hydrotreating operations. Recently, e.g., it was disclosed in U.S. Pat. Nos. 4,243,553 and 4,243,554 that molybdenum disulfide catalysts of relatively high surface area can be obtained by thermally decomposing selected thiomolybdate salts at temperatures ranging from 300°-800° C. in the presence of essentially inert, oxygen-free atmospheres, e.g., atmospheres of reduced pressure, or atmospheres consisting of argon, nitrogen, and hydrogen, or mixtures thereof. In accordance with the former, a substituted ammonium thiomolybdate salt is thermally decomposed at a vary slow heating rate of from about 0.5 to 2° C./min and in accordance with the latter an ammonium thiomolybdate salt is decomposed at a rate in excess of 15° C. per minute to form the high surface area molybdenum disulfide.

There remains a need in the art for new, improved hydrotreating catalysts, especially hydrotreating catalysts which are more highly active, selective, and stable.

It is accordingly a primary objective of the present invention to provide this need, particularly by providing a process for the preparation of these catalysts, and a process for the use of these catalysts in conducting hydrotreating reactions.

A more particular object is to provide a new and improved process for producing both promoted and unpromoted species, and both supported and unsupported species of such catalysts, which have admirably high activity, and selectivity, in conducting hydrodesulfurization and hydrodenitrogenation reactions, or both, particularly hydrodenitrogenation reactions, at high levels of hydrogen efficiency with various sulfur and nitrogen containing hydrocarbon feeds.

DESCRIPTION OF THE INVENTION

These and other objects are achieved in accordance with the present invention wherein, in the preparation of a catalyst, a catalyst percursor comprising an ammonium, or substituted ammonium tri-molybdenum polysulfide complex salt, or molybdenum trimer, is contacted with a hydrocarbon feedstock, or hydrocarbons, and decomposed, in the presence of hydrogen, and sulfur, or sulfur-bearing compound. The catalyst precursor, when decomposed in the presence of hydrogen, and hydrocarbon and sulfur, form a reaction product which is a highly active, selective and stable hydrotreating catalyst.

The catalyst precursor, i.e., the ammonium, or substituted ammonium tri-molybdenum polysulfide complex salt, or molybdenum trimer, is characterized by the formula

where B is an ammonium ion, polyammonium ion, or tertiary or quaternary phosphonium ion, or an organo or hydrocarbyl substituted ammonium ion (e.g., a primary, secondary, tertiary or quaternary substituted ammonium ion), organo or hydrocarbyl substituted polyammonium ion, or an organo or hydrocarbyl substituted tertiary or quaternary phosphonium ion, x is 1 where B is a divalent cationic moiety, or 2 where B is a monovalent cationic moiety, and [Mo$_3$S$_z$] is a divalent anionic moiety wherein z is an integer ranging from about 10 to about 46, preferably from about 12 to about 20.

These precursor catalyst species can be unsupported, or supported as where distended or dispersed upon a porous, refractory inorganic oxide carrier. In forming a supported precursor catalyst species, the trimer is formed in situ upon the support, or the trimer, after its formation, is dispersed or dissolved in a solvent and incorporated with a preselected quantity of said porous, refractory inorganic oxide support, preferably a particulate mass of said support, and the trimer-containing support then preferably dried without decomposition of said trimer, to remove all or a portion of the solvent from the support. Suitably, sufficient trimer is incorporated on the support to provide from about 3 percent to about 20 percent, preferably from about 6 percent to about 17 percent of molybdenum as trimer, expressed as weight percent Mo on an ignition loss free basis. In completing formation of a catalyst the dried particulate mass containing the precursor catalyst species is contacted and decomposed in the presence of hydrogen with a hydrocarbon, and sulfur or a sulfur-bearing compound; or contacted and decomposed in the presence of hydrogen with a compound which supplies both the hydrocarbon and sulfur species, i.e., a sulfur-containing hydrocarbon compound, e.g., a heterocyclic sulfur containing compound, or compounds. In conducting a hydrotreating reaction, a hydrocarbon feedstock and hydrogen are contacted with the catalyst at hydrotreating conditions.

The catalyst precursor B$_x$[Mo$_3$S$_z$], exists as a complex salt between one, two or more of the B$_x$ cationic moieties and the [Mo$_3$S$_z$] anionic moiety, as required to satisfy the negative charge of the [Mo$_3$S$_z$] anionic moiety. For example, when the anionic moiety has a minus two (2−) charge, B$_x$ can be a pair of ammonium ions, a pair of quaternary phosphonium ions, or a pair of organo or hydrocarbyl substituted monovalent ammonium ions, or a pair of organo or hydrocarbyl substituted tertiary or quaternary phosphonium ions, or B$_x$ can be a doubly charged diammonium ion, or an organo or hydrocarbyl substituted polyammonium ion. The doubly charged [Mo$_3$S$_z$] anionic moiety, on the other hand, contains three atoms of molybdenum, the molybdenum atoms being bonded together to form a metallic cluster wherein the molybdenum is associated with from about 10 to about 46 atoms of sulfur, preferably from about 12 to about 20 atoms of sulfur. In the molybdenum trimer, it is believed that the [Mo$_3$S$_z$] anion exists as Mo$_3$(S$_2$)$_6$S, or Mo$_3$S$_{13}$. Often however, satisfactory catalyst species are formed wherein the amount of sulfur associated with the molybdenum of the [Mo$_3$S$_z$] moiety appears less than that required to satisfy the valence of the molybdenum, and quite often the [Mo$_3$S$_z$] anionic moiety appears to contain more sulfur than required to satisfy the valence of the molybdenum, i.e., it is excessively sulfur rich. The range of ratios of sulfur to molybdenum appears to be due to the tendency of sulfur to form chain structures and ring structures which are of only limited influence on the basic trimolybdenum structure, except for a dilution effect. The structures can thus contain, e.g., rings with S$_2$, S$_3$, S$_4$, or S$_5$ moieties in place of the S$_2$ moieties in the nominal, or parent, structure; although the basic Mo$_3$S nucleus remains the same. Likewise, some of the polysulfide ligands may be bridges between metal cluster nucleii, thus leading to the formation of polymeric materials.

In the formation of the B moiety, or moieties, the substitutent members of the substituted ammonium ion, polyammonium ion, tertiary or quaternary phosphonium ion, can be an organo, a hydrocarbyl or a hydrocarbon group, or groups, and the substitutent organo, hydrocarbyl or hydrocarbon group, or groups, can be inertly substituted. Exemplary of an organo, a hydrocarbyl radical or hydrocarbon substituent radical is one selected from the group consisting of alkyl, aralkyl, cyloalkyl, aryl, alkaryl, alkenyl, and alkynyl including such radicals when inertly substituted. Such radical can thus be exemplified by hydrocarbon groups which contain from one to about 30 carbon atoms, preferably from one to about 20 carbon atoms. When the hydrocarbyl, or hydrocarbon radical is alkyl, it can typically be methyl, ethyl, n-propyl, iso-propyl, n-butyl, i-butyl, sec-butyl, amyl, octyl, decyl, octadecyl, and the like. When it is aralkyl it can typically be benzyl, beta-phenylethyl, and the like. When it is cycloalkyl, it can typically be cyclopentyl, cyclohexyl, cycloheptyl, cyclooctyl, 2-methylcycloheptyl, 3-butylcyclohexyl, 3-methylcyclohexyl, and the like. When it is aryl, it can typically be phenyl, ethylphenyl, and the like. When alkaryl, it can typically be tolyl, xylyl, and the like. When alkenyl, it can typically be vinyl, allyl, 1-butenyl, and the like. When it is alkynyl, it can typically be ethynyl, propynyl, butynyl, and the like. The hydrocarbyl, or hydrocarbon radical can be inertly substituted, i.e., it may bear a non-reactive substitutent such as alkyl, aryl, cycloalkyl, ether, halogen, nitro, hydroxy, and the like. Typically inertly substituted groups may include 3-chloropropyl, 2-ethoxyethyl, carboethoxymethnyl, 4-methylcyclohexyl, p-chlorophenyl, p-chlorobenzyl, 3-chloro-5-methylphenyl, methoxyethyl, methoxyethoxyethyl, hydroxyethyl, etc. Substituted ammonium ions of such types are thus those containing one organo or hydrocarbyl group, e.g., $n\text{-}C_4H_9NH_3^+$, $C_6H_5NH_3^+$, and the like, those containing two organo or hydrocarbyl groups, e.g., $(C_2H_5)_2HN_2^+$, $(C_2H_5)_2NH_2^+$, and the like, those containing three organo or hydrocarbyl groups, e.g., $(n\text{-}C_6H_{13})_3NH^+$, $(C_6H_5)_3NH^+$, $(n\text{-}C_4H_9)_3PH^+$, and the like; those containing four organo or hydrocarbyl groups, e.g., $(C_6H_{13})_4N^+$, $(C_6H_5)_3P^+(CH_2C_6H_5)$, $(C_6H_5CH_2)_3^+NCH_3$, $(C_6H_5)_4P^+$ and the like; and those containing greater than four organo or hydrocarbyl groups as when the moiety is a substituted diammonium ion, e.g., $[(CH_3)_3N^+CH_2CH_2CH_2]_2$, $[(CH_3)_2N^+HCH_2CH_2]_2$, and the like.

The $B_x[Mo_3S_z]$ catalyst precursor can be conveniently prepared by synthesis from an ammonium, or organo or hydrocarbyl substituted ammonium polysulfide, or hydropolysulfide, and an ammonium, or organo or hydrocarbyl substituted ammonium, or alkali metal, oxo, thio, or oxothio molybdenum salt. The ammonium, or organo or hydrocarbyl substituted ammonium polysulfide, or hydropolysulfide, is made by reaction between an ammonium, or organo or hydrocarbyl substituted ammonium polysulfide, or hydropolysulfide, and hydrogen sulfide, in solution, e.g., as represented by the equation

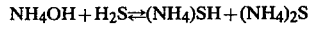

to which sulfur is added, as represented by the equations, e.g.,

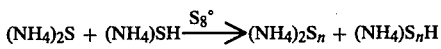

where n ranges from about 1.05 to about 5.5, preferably from about 1.1 to about 3.1. Exemplary of oxo ammonium molybdate salts are $(NH_4)_6Mo_7O_{24}$, $(NH_4)_2MoO_4$ and $(NH_4)_2Mo_2O_7$ which are prepared by reaction between ammonium hydroxide and molybdic acid or molybdenum trioxide, the species actually formed in such reaction being directly related to the pH of the solution. Similar alkali metal salts, e.g., sodium salts, can also be utilized. Exemplary of thio ammonium salts is $(NH_4)_2MoS_4$, and exemplary of oxothio ammonium salts is $(NH_4)_2MoO_2S_2$. The ammonium, or organo or hydrocarbyl substituted ammonium polysulfide, or hydropolysulfide and the ammonium, or organo or hydrocarbyl substituted ammonium, oxo, thio, or oxothio molybdenum salt are contacted or brought together to form the synthesis mixture.

An admixture of ammonium heptamolybdate, $(NH_4)_6Mo_7O_{24}$, and ammonium polysulfide, or ammonium hydropolysulfide, $NH_4S_xH$, can, e.g., be reacted to produce the trinuclear cluster, or trimer, characterized as $(NH_4)_2[Mo_3(S_2)_6S]$ as well as non-stoichiometric forms thereof of variable sulfur contents. In general, e.g., the reaction between ammonium heptamolybdate, ammonium dimolybdate, or ammonium molybdate and concentrated aqueous ammonium polysulfide, or ammonium hydropolysulfide, at about ambient temperature, e.g., 25° C., over a period of about 18 hours at pH ranging from about 8 to about 14, will produce an essentially brown in color amorphous structure, essentially an $Mo_3$ structure of variable ammonium ion and sulfur contents; but which nonetheless has catalytic activity. Reaction at higher temperature, e.g., about 60°–70° C., over a period of about 5 hours produces the trinuclear cluster, or trimer, characterized as $(NH_4)_2[Mo_3(S_2)_6S]$, a crystalline material maroon in color, inclusive particularly of non-stoichiometric forms thereof of variable sulfur content. A related higher sulfur compound also occurs in which some of the $S_2$ moieties appear to be $S_x$, where x is a number ranging from about 2 to about 5. A red crystalline material, $(NH_4)_2[Mo_3(S_2)_6S]$ can in turn be synthesized directly by the reaction of ammonium heptamolybdate, ammonium dimolybdate, or ammonium molybdate and ammonium polysulfide, or ammonium hydropolysulfide, at more elevated temperatures, e.g., 85°–90° C., at pH ranging from about 8 to about 14 over a period of about 18 hours to about 75 hours with concurrent escape of $NH_3$ and $H_2S$ by allowing the solution to boil vigorously. The reaction procedure evidently forces the transfer of sulfur from ammonium polysulfide species to the apparently previously formed maroon, or dark red $(NH_4)_2[Mo_3(S_2)_6S]$ compound.

The molybdenum polysulfide catalyst can be employed in bulk, or unsupported form, or composited or otherwise intimately associated with a porous, inorganic oxide support by various techniques known to the art, such as coprecipitation, impregnation or the like. The dispersion of the catalyst on a support has been found to considerably increase its activity. Generally, when preparing a catalyst from the $(NH_4)_2[Mo_3(S_2)_6S]$ catalyst precursor species, the selectivity pattern is greatly attenuated when compared against a conventionally prepared (calined) $MoO_3$ catalyst. The (NH$_4$)$_2$[Mo$_3$(S$_2$)$_6$S] type catalyst have about 35% more HDN activity while possessing much less HDS activity (about 65% less) along with lower hydrogenation activity (about 10% less). The composite may be formed from a solution of the desired precursor catalyst species by impregnation of the support, typically via an "incipient wetness" technique which requires a minimum of solution for uptake of the total solution within which the preselected desired amount of the catalyst precursor is adsorbed, initially or after some evaporation. Virtually, any solvent can be employed which is capable of dissolving the precursor catalyst species without adversely reacting therewith. Albeit, an aqueous solvent can be employed, non-aqueous solvents are preferred because few of the catalyst precursor species are adequately soluble in water. Suitable solvents for dissolving these precursor catalyst species are dimethylformamide, dimethylacetamide, dimethylsulfoxide, acetonitrile and the like. Typically, a particulate porous refractory inorganic oxide, notably alumina, in the form of beads, pills, pellets, sieved particles, extrudates, or the like in dry or solvated state is contacted with a solution of the precursor catalyst species, or admixture of the precursor catalyst species, with the result that the salt solution is adsorbed into the particulate material in the desired amount. Typically, because of the low solubility of the precursor catalyst species, multiple impregnations are required. A support is impregnated with the solution, the support dried, and such steps repeated. The catalyst precursor-containing particulate material is always heated and dried at low temperature, with or without vacuum assistance, e.g., at temperatures ranging at or below the boiling temperature of the solvent, excessive temperature being avoided until such time that the catalyst precursor is decomposed in the presence of hydrogen, hydrocarbon, and sulfur to produce the active catalyst species.

The preferred support is alumina, and the composite support can contain for example, one or more of alumina, bentonite, clay, diatomaceous earth, zeolite, silica, activated carbon, magnesia, zirconia, thoria, titania and the like, these latter with alumina, usually in a range of about 1 to 20 percent, based on the weight of the support. A preferred support for the practice of the present invention is one having a surface area of more than 50 m$^2$/g, preferably from about 100 to about 300 m$^2$/g, a bulk density of about 0.3 to 1.0 g/ml, preferably about 0.4 to 0.8 g/ml, an average pore volume of about 0.2 to 1.1 ml/g, preferably about 0.3 to 0.8 ml/g, and an average pore diameter of about 30 to 300 Å.

The precursor catalyst species impregnated support is preferably dried to remove all or a portion of the solvent, preferably at a temperature below about 100° C., more preferably between about 50° C. and 80° C., in the presence of nitrogen or oxygen, or both, at static or dynamic conditions, in air or under reduced pressure. The impregnated support, or composite formed via other methods, on a dry basis, contains from about 3 percent to about 20 percent, preferably from about 6 percent to about 17 percent of molybdenum as the undecomposed precursor catalyst species, expressed as weight percent Mo on an ignition loss free basis.

The catalyst precursor, whether supported or unsupported, is heated to the decomposition temperature, and decomposed in the presence of hydrogen, and a hydrocarbon and sulfur, or sulfur-bearing compound, e.g., at "on-oil" conditions, to form the active catalyst species of this invention. The nature of the hydrogen is not critical, and can generally include any hydrocarbon compound, acyclic or cyclic, saturated or unsaturated, unsubstituted or inertly substituted. The preferred hydrocarbons are those which are liquid at ordinary temperatures, exemplary of which are such straight chain saturated acyclic hydrocarbons as octane, tridecane, eicosane, nonacosane, or the like; straight chain unsaturated acyclic hydrocarbons as 2-hexene, 1,4-hexadiene, and the like; branched chain saturated acyclic hydrocarbons as 3-methylpentane, neopentane, isohexane, 2,7,8-triethyldecane, and the like; branched chain unsaturated acyclic hydrocarbons such as 3,4-dipropyl-1,3-hexadiene-5-yne, 5,5-dimethyl-1-hexene, and the like; cyclic hydrocarbons, saturated or unsaturated, such as cyclohexane, 1,3-cyclohexadiene, and the like; and including such aromatics as cumene, mesitylene, styrene, toluene, o-xylene, or the like. The more preferred hydrocarbons are those derived from petroleum, including especially admixtures of petroleum hydrocarbons characterized as virgin naphthas, cracked naphthas, Fischer-Tropsch naphtha, light cat cycle oil, heavy cat cycle oil, and the like, typically those containing from about 5 to about 30 carbon atoms, preferably from about 5 to about 20 carbon atoms and boiling within a range of from about 30° C. to about 450° C., preferably from about 150° C. to about 300° C.

The sulfur, or sulfur-bearing compound, is characterized as an organo-sulfur, or hydrocarbyl-sulfur compound which contains one or more carbon-sulfur bonds within the total molecule, and generally includes acyclic or cyclic, saturated or unsaturated, substituted or inertly substituted compounds. Exemplary of acyclic compounds of this character are ethyl sulfide, n-butyl sulfide, n-hexylthiol, diethylsulfone, allyl isothiocyanate, dimethyl disulfide, ethylmethylsulfone, ethylmethylsulfoxide, and the like; cyclic compounds of such character are methylthiophenol, dimethylthiophene, 4-mercaptobenzoic acid, benzenesulfonic acid, 5-formamido-benzothiazole, 1-naphthalenesulfonic acid, dibenzylthiophene, and the like. The sulfur must be present in at least an amount sufficient to provide the desired stoichiometry required for the catalyst, and preferably is employed in excess of this amount. Suitably, both the hydrocarbon and sulfur for the reaction can be supplied by the use of a sulfur-containing hydrocarbon compound, e.g., a heterocyclic sulfur compound, or compounds. Exemplary of heterocyclic sulfur compounds suitable for such purpose are thiophene, dibenzothiophene, tetraphenylthiophene, tetramethyldibenzothiophene, tetrahydrodibenzothiophene, thianthrene, tetramethylthianthrene, and the like. The hydrogen required for forming the catalysts of this invention may be pure hydrogen, an admixture of gases rich in hydrogen or a compound which will generate in situ hydrogen, e.g., a hydrogen-generating gas such as carbon monoxide mixtures with water, or a hydrogen donor solvent.

In decomposing the catalyst precursor, a bed of the dried catalyst precursor is contacted in a hydrogen atmosphere with both the hydrocarbon and sulfur, or sulfur-bearing compound, and heated at conditions which decompose said catalyst precursor. For example, a fixed bed of the dried catalyst precursor is charged into a reaction vessel and contacted with a liquid hydrocarbon, or admixture of liquid hydrocarbons, generally at a flow rate of hydrocarbon:catalyst precursor of from about 0.05 to about 50, preferably from about 0.1 to about 10, volumes of hydrocarbon per volume of catalyst per hour, a flow rate of hydrogen ranging from about 250 to about 5000 SCF/Bbl, preferably from about 500 to about 3000 SCF/Bbl, and at pressures ranging from about 50 to about 4000 pounds per square inch gauge (psig), preferably 150 to about 2500 psig. Typically the hydrocarbon is introduced downflow, but can be introduced upflow or downflow, over the bed of catalyst precursor, with the organo, or hydrocarbyl sulfur compound being added to the hydrocarbon feed. The organo, or hydrocarbyl sulfur compound is added in sufficient quantity to the feed such that the sulfur content of the feed ranges from about 0.1 percent to about 90 percent, preferably from about 0.5 percent to about 3 percent, calculated as elemental sulfur based on the weight of the hydrocarbon feed. The temperature of the reaction is gradually raised until the decomposition temperature of the catalyst precursor is reached, at which time the temperature is held substantially constant until the decomposition reaction is completed. Typically the decomposition temperature of the catalyst precursor ranges between about 200° C. and 400° C., more often between about 250° C. and 350° C.

The catalyst of this invention can be promoted with an additional hydrogenation-dehydrogenation metal, or metals, to further dramatically increase the activity of the finished catalyst. Suitably, this is done by the further addition of a Group VIII metal of the Periodic Table of the Elements (E. H. Sargent & Co., Copyright 1962, Dyna-Slide Co.), which metal can be added to the refractory porous inorganic oxide, or alumina, support prior to, simultaneously with, or subsequent to the decomposition of the catalyst precursor on treatment of the catalyst precursor in the presence of hydrogen, hydrocarbon, and sulfur components. Typically such metal promoter, or metal promoters, notably, iron, cobalt, and nickel, alone or in admixture one metal with another, or with other metals, is incorporated with the support, notably alumina, as via cogellation or impregnation prior to incorporation of the catalyst precursor with the dried, calcined support. Preferred promoters are cobalt, nickel, and ruthenium, most preferably cobalt and nickel, because of the extraordinary expense of ruthenium.

Group VIII metal components, admixed one component with another or with a third or greater number of metal components, are preferably composited or intimately associated with the porous inorganic oxide support, e.g., alumina, by impregnation of the support with metals via an "incipient wetness" technique, or technique wherein a metal, or metals is contained in solution, preferably in water or methyl alcohol, in measured amount, and the entire solution is absorbed into the support and subsequently dried to form the catalyst. The volume amount of solution to be employed in such recipe is separately determined by measuring the amount of solvent required to wet a known weight of support to the point where some liquid bridging between particles or some miniscus formation between particles and container walls just becomes evident. This ratio of volume of solution to weight of support is then used proportionally to calculate the volume of solution containing catalyst metals to be used in the incipient wetness impregnation. Impregnation by adsorption of the metals from dilute solution onto the support can also be used but this method is more appropriate for low concentrations, e.g., from about 0.01 to about 1.0 percent of catalytic metals desired, and it is less preferable for use in the higher metals concentration ranges. The metal impregnated support, after impregnation, is dried, e.g., at temperatures ranging from about 20° C. to about 150° C., preferably at ambient temperatures, e.g., from about 20° to about 30° C., until free flowing and then from about 80° C. to about 110° C. as in a circulating air, vacuum oven, microwave oven, or the like. A catalyst formed from a $(NH_4)_2[Mo_3(S_2)_6S]$ precursor catalyst supported on alumina, and impregnated with additional cobalt has been found to have a superior HDN/HDS selectivity pattern compared to conventionally prepared (calcined) commercial catalysts. Specifically, the ratio of HDN activity to HDS activity is 1.9 for the cobalt promoted $(NH_4)_2[Mo_3(S_2)_6S]$ catalyst compared to 0.9 for a commercial catalyst.

The molybdenum polysulfide precursor catalysts can be conveniently prepared from a water or an off-the-shelf aqueous dilute or concentrated ammonium hydroxide solution of ammonium heptamolybdate, ammonium molybdate, ammonium dimolybdate, or ammonium thiomolybdate, i.e., molybdenum (VI) compounds, one or the other or mixtures of which can be reacted with a freshly made ammonium hydropolysulfide or diammonium polysulfide solution, or both, to form the catalyst precursor, $B_x[Mo_3S_z]$. To form the ammonium hydropolysulfide or diammonium polysulfide solution, or admixture thereof, $NH_4S_xH/(NH_4)_2S_x$, 1200 ml of aqueous concentrated ammonium hydroxide (concentration about 15 moles per liter), and 1800 ml of distilled water are admixed together, and hydrogen sulfide is bubbled or sparged therethrough at ambient temperature to thoroughly saturate the solution. The reaction produces heat and therefore the sparging must periodically be stopped to allow the solution to cool before more hydrogen sulfide is added. The formation of the ammonium sulfide/ammonium hydrosulfide is completed when at ambient temperature the solution does not accept further hydrogen sulfide. A 540 gram aliquot of elemental sulfur powder is then added at ambient temperature, with vigorous stirring to dissolve the sulfur in the solution, this reaction being generally represented by the equation:

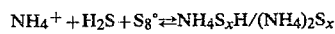

$$NH_4^+ + H_2S + S_8° \rightleftharpoons NH_4S_xH/(NH_4)_2S_x$$

Reaction between the $NH_4S_xH/(NH_4)_2S_x$ and, e.g., the ammonium heptamolybdate, $(NH_4)_6Mo_7O_{24}$, at preselected conditions produces the molybdenum polysulfide catalyst precursor species falling within the following spectrum of potential products, to wit: (a) $(NH_4)_nMo_mS_x$ a brown amorphous $Mo_3$ structure of variable sulfur content; (b) $(NH_4)_2[Mo_3(S_2)_6S]$, a maroon crystalline $Mo_3$ structure of variable sulfur content; and (c) $(NH_4)_2[Mo_3(S_2)_6S]$, a red crystalline $Mo_3$ structure also or variable sulfur content. The precursors to the most active catalyst species are the red crystalline $Mo_3$ materials.

In the preparation of the catalyst precursors, the catalyst precursors are decomposed in an atmosphere of hydrogen, in the presence of hydrocarbon and sulfur; the latter species of which can be provided by a sulfur-containing hydrocarbon species, or separately by a hydrocarbon compound, or compounds, and sulfur or a sulfur-containing compound, or compounds. The catalyst precursors decompose at hydrotreating conditions, and at temperatures ranging between about 200° C. and 400° C., and more generally between about 250° C. and 350° C. which temperatures correspond generally with, or are exceeded by hydrotreating temperatures. Where, however, the decomposition temperature of the catalyst precursor is lower than the desired hydrotreating temperature, the temperature in conducting the hydrotreating process is raised to that which is desired for conducting the hydrotreating operation. In a typical operation, hydrotreating conditions are provided as regards hydrogen pressure, space velocity, and hydrogen gas recycle rate, and the temperature is gradually raised to the decomposition temperature of the catalyst precursor, the catalyst precursor is decomposed in the presence of the hydrogen, hydrocarbon and sulfur to form the catalytically active species, and the temperature then further increased as desired to conduct the hydrotreating operation. Hydrotreating conditions vary considerably depending on the nature of the hydrocarbon being hydrogenated, the nature of the impurities or contaminants to be reacted or removed, and, inter alia, the extent of conversion desired, if any. In general however, the following are typical conditions for hydrotreating a naphtha boiling within a range of from about 25° C. to about 210° C., a diesel fuel boiling within a range of from about 170° C. to 350° C., a heavy gas oil boiling within range of from about 325° C. to about 475° C., or residual containing from about 10 percent to about 50 percent of a material boiling above about 575° C., to wit:

| Feed | | Temperature, °C. | Pressure, psig | Space Velocity V/V/Hr | Hydrogen Gas Rate SCF/B |
|---|---|---|---|---|---|
| Naphtha | Typical | 100–370 | 150–800 | 0.5–10 | 100–2000 |
| | Preferred | 150–260 | 250–400 | 2–6 | 500–1500 |
| Diesel Fuel | Typical | 200–400 | 250–1500 | 0.5–4 | 500–6000 |
| | Preferred | 260–340 | 400–1000 | 1–2 | 1000–2000 |
| Heavy Gas Oil | Typical | 260–430 | 250–2500 | 0.3–2 | 1000–6000 |
| | Preferred | 320–385 | 600–1250 | 0.5–1 | 1500–4000 |
| Residuum | Typical | 340–450 | 1000–5000 | 0.1–1 | 2000–10,000 |
| | Preferred | 360–400 | 1250–2000 | 0.25–0.5 | 4000–6000 |

The invention will be more fully understood by reference to the following selected nonlimiting examples and comparative data which illustrate its more salient features. Reactant quantities are given in terms of metric units (cubic centimeters, cc, or grams), flow rates in terms of liters per hour, pressures in pounds per square inch gauge (psig), and temperatures in degrees Centigrade, except as otherwise specified.

The following describes the preparation of specific catalyst precursor materials, the preparation of highly active, highly selective hydrotreating catalysts from the precursor materials, the use of said catalysts in conducting a series of hydrocarbon hydrotreating runs, and comparative runs made with catalysts not of this invention.

Catalysts were prepared, and data were obtained in a 300 cc autoclave unit provided with an automatic stirrer, the unit having been equipped with slurried catalyst and reactant inlets, a hydrogen gas inlet, and sample and purge gas outlets. The autoclave unit was operated while maintaining a stirred, approximately 150 cc liquid phase, while injecting hydrogen into an approximately 150 cc vapor space at a rate of 2 liters per hour, while simultaneously continuously removing an H$_2$S-containing hydrogen stream to maintain a <5% H$_2$S/hydrogen atmosphere within the autoclave. In preparing the catalyst for conducting a run, a weighed charge of 100–150 mesh (Tyler) average particle size of the sulfided catalyst precursor was slurred in hexadecane from a secondary overhead vessel and this was added to the autoclave, the slurry having been pressured into the autoclave with 600 psig hydrogen. The feed charged into the unit was a slurry constituted of 40 cc methylnaphthalene (MNAP), 10 grams of dibenzolthiophene (DBT) and 2 grams of 2,6-dimethylquinoline (DMQ) in 100 cc of hexadecane heated to 325° C. The stirrer was turned at 450 rpm, and pressure increased until it lined out at 500 psig. The sulfided catalyst precursor decomposed at on-oil conditions forming the hydrotreating catalyst in situ. The ability of the catalyst to produce hydrogenation of the MNAP, hydrodesulfurization of the DBT, and hydrodenitrogenation of the DMQ over a period of six hours was taken as a measure of the effectiveness of the catalyst for use in conducting these types of hydrotreating reactions. Product from the autoclave was withdrawn and then passed to a capillary gas chromatograph and analyzed. First order rate constants for the disappearance of the MNAP and DBT, and zero order rate constants with induction for disappearance of the DMQ were calculated.

In the example immediately following it is demonstrated that a catalyst prepared from a tri-molybdenum polysulfide catalyst precursor by on-oil decomposition in accordance with this invention is far superior to one prepared by decomposition of an identical catalyst precursor material in an inert gas atmosphere.

EXAMPLE 1

A sample of the ammonium form of the material, (NH$_4$)$_2$[Mo$_3$(S$_2$)$_6$S], designated Catalyst A precursor, was prepared by dissolving 160.0 gm of ammonium heptamolybdate (NH$_4$)$_6$Mo$_7$O$_{24}$.4H$_2$O, containing 0.906 mole of Mo in 800 cc of H$_2$O with warming to about 70°–80° C. This warm solution was then added to a freshly prepared and heated solution of aqueous ammonium polysulfide in a 6-liter Ehrlenmeyer flask heated in a water bath and stirred with a Teflon coated magnetically driven stirring bar. The solution was stirred and heated at 60°–65° C. in the watch glass covered flask for 5 hours, after which the flask of material was cooled in flowing water to room temperature and immediately filtered and washed with 100 gm aliquots of ammonium polysulfide solution, ammonium sulfide solution, water, ethanol, carbon disulfide, and diethyl ether (in that order), after which the micro-crystalline material was dried in a desiccator. The yield was approximately 289 gms of the catalyst precursor material, (NH$_4$)$_2$[Mo$_3$(S$_2$)$_6$S].xH$_2$O.

Catalyst A precursor, in amount weighing 5 grams and containing 1.94 gm of Mo was slurried in 50 ml of hexadecane and charged to a small vessel for the in situ preparation of Catalyst A. A 300 cc autoclave was charged with 100 ml of hexadecane, 40 ml of 1-methylnaphthalene, 10 gm of dibenzothiophene and 2 gm of dimethylquinoline. The autoclave was closed and stirring started at 450 RPM. Hydrogen was added to the reactor at 2 liters/hr to maintain the H$_2$S concentration in the reactor at <5 mol %. The reactor temperature was increased to 325° C. and the pressure maintained at 500 psig. When the autoclave was at steady state, the 5-gm sample of the Catalyst A precursor slurried in hexadecane was pressured into the autoclave. Samples were withdrawn every hour over a 6-hour period and analyzed by capillary GC. Rate constants were calculated using first order kinetics for 1-methylnaphthalene (MNAP hydrogenation) and dibenzothiophene (HDS) disappearance. Zero order kinetics with an induction time were used to calculate rate constants for the disappearance of nitrogen-containing compounds (HDN). The rate constants were adjusted to a "per gram of molybdenum" basis. These data are given in Table I.

For purposes of comparison, a similar test was carried out on a portion of the Catalyst A precursor except the material was decomposed in flowing nitrogen as described in U.S. Pat. No. 4,243,554. A sample of the Catalyst A precursor was thus charged to a tube furnace and heated from room temperature to 450° C. at a rate of 20° C./min and held for one hour at 450° C. The sample was allowed to cool to room temperature and discharged in a glove box. A 5-gram sample containing 3.00 gm of Mo was slurried in 50 cc of hexadecane and the autoclave test carried out as described above. The rate constants on a "per gram of molybdenum" basis are compared in Table I. Quite obviously, the catalyst species of this invention profoundly differs from those produced by the teaching of the patent.

TABLE I

| Catalyst A | Rate Constants/gm of Mo (Hr)$^{-1}$ | | |
|---|---|---|---|
| | MNAP Hydrogenation | HDN | HDS |
| Decomposed "On-Oil" | 0.36 | 0.86 | 0.07 |
| Decomposed in N$_2$ | 0.21 | 0.42 | 0.06 |

These results show that decomposing the catalyst precursor under reaction, or on-oil conditions in accordance with this invention resulted in a catalyst with 71% more 1-methylnaphthalene hydrogenation activity and 104% more activity for the hydrodenitrogenation of dimethylquinoline. It is particularly interesting that Catalyst A has higher activity for hydrodenitrogenation in comparison to its activity for hydrodesulfurization.

In the following, there is described the preparation of several catalysts from a tri-molybdenum polysulfide catalyst precursor at different on-oil conditions.

EXAMPLE 2

Specimens of the Catalyst A precursor material, (NH$_4$)$_2$[Mo$_3$(S$_2$)$_6$S], were decomposed "on-oil" in a series of tests at different temperatures, pressures, and partial pressures of H$_2$S to determine optimum conditions for decomposition of said precursor. Each test was carried out in the autoclave, as described in Example 1. The autoclave was maintained at steady state conditions for the desired decomposition, and the catalyst slurry was pressured into the autoclave. After 5 minutes at decomposition conditions, the treat gas rate, pressure and temperature were changed to run conditions. Since the amount of hydrodesulfurization is very low for this material, HDS rate constants were not calculated. The relative activities for 1-methylnaphthalene disappearance (MNAP hydrogenation) and disappearance of nitrogen-containing molecules (HDN) are shown in the Table II. In this case, rate constants for MNAP hydrogenation were calculated using first order kinetics, including an adsorption term for MNAP. The HDN rate constant was calculated using 0.5 order kinetics which approximates zero order kinetics with induction.

TABLE II

| Test No | Decomposition Conditions | | Run Temperature °C. | Relative Activities | |
|---|---|---|---|---|---|
| | °C. | H$_2$ psig | | MNAP Hydrogenation | HDN |
| A | 325 | 0 | 325 | 100 | 100 |
| B | 300 | 0 | 325 | 163 | 126 |
| C | 350 | 0 | 325 | 247 | 138 |
| D | 300 | 0 | 300 | 21 | 53 |
| E | 350 | 0 | 350 | 1086 | 158 |
| F | 325 | 70 | 325 | 53 | 98 |
| G | 325 | 10 | 325 | 233 | 152 |

Test A is the same as described in Example 1 for "on-oil" decomposition and has been assigned standard activities of 100 for both MNAP hydrogenation and the HDN reaction. The results indicate that decomposition at 300° (Test B) and 350° C. (Test C) is preferred over decomposition at 325° C., with the higher temperature decomposition being preferred. As expected, when the catalyst is decomposed at 300° C. and run at the same temperature, lower activity results (Test D). When decomposed and run at 350° C. (Test E), the catalyst shows very high activities, especially for MNAP hydrogenation. The effect of H$_2$S partial pressure during decomposition (Tests F and G) shows excessive H$_2$S partial pressure (70 psig) and decreased activity, while a moderate addition of H$_2$S (10 psig) appears to enhance the decomposition and improve activation.

EXAMPLE 3

A tetramethylammonium form of the catalyst precursor material was formed by cation exchange of Catalyst A and is designated Catalyst B. In conducting the exchange, a 100 gm sample of Catalyst A was suspended in a solution of 281 gm of tetramethylammonium chloride in 400 ml of distilled water in a 1-liter Ehrlenmeyer flask and stirred magnetically with a Teflon covered stirring bar at room temperature for seven days. The product was filtered and dried in a vacuum disiccator and gave 94.4 gm of $$[(CH_3)_4N]_2[Mo_3(S_2)_6S].$$

A 5-gram sample of Catalyst B was slurried in a 50 cc of hexadecane, decomposed on-oil and then tested in the autoclave as described in the preceding examples. A second sample of Catalyst B was decomposed in nitrogen at 450° C. as described in Example 1 and then similarly tested in the autoclave. The comparative results are given in the Table III.

TABLE III

| Catalyst B | Rate Constants/gm of Mo (Hr)$^{-1}$ | | |
|---|---|---|---|
| | MNAP Hydrogenation | HDN | HDS |
| Decomposed "On-Oil" | 0.48 | 1.04 | 0.07 |
| Decomposed in N$_2$ | 0.41 | 0.60 | 0.04 |

These data show that when decomposed "on-oil," the hydrogenation rate is 33% higher for the tetramethylammonium form (Catalyst B) and the HDN rate is increased by 21% due to exchange with the [(CH$_3$)$_4$N]$^+$ cation, as contrasted with Catalyst A (ammonium form) decomposed on-oil. There is no change in the already low HDS rate. When Catalyst B was decomposed in N$_2$ at 450° C., as shown by these data, the activities for hydrogenation, HDN, and HDS were 85%, 58%, and 57%, respectively, when compared to Catalyst B decomposed "on-oil." These data show exchange of the ammonium form of $Mo_3$ polysulfide material with the tetramethylammonium cation enhances the catalytic activity. When the tetramethylammonium form is decomposed under nitrogen at high temperature, the activities are seriously impaired.

EXAMPLE 4

Preparation of Catalyst C: A first 50.0 gram sample of $(NH_4)_2[Mo_3(S_2)_6S]$ prepared in a manner similar to that used for Catalyst A was suspended in 650 ml of $H_2O$ containing 20.5 g of cobalt diacetate hydrate $[Co(CH_3CO_2)_2.7H_2O]$, and the slurry stirred for 7 days in a 1-liter Ehrlenmeyer flask, after which the solids were filtered and dried in a vacuum desiccator. 68 g of $Co[Mo_3S(S_2)_6](NH_4)_2[Mo_3S(S_2)_6]$ with a Co/Mo atom ratio of 1/6.9 was obtained and designated as Catalyst C. This represents about 42% exchange of the ammonium cation with cobalt.

Preparation of Catalyst D: A second 50.0 gram sample of the $(NH_4)_2[Mo_3(S_2)_6S]$ was then impregnated with a solution of 6.14 g of cobalt diacetate hydrate in 50 ml of $H_2O$ three times in succession with drying in a vacuum desiccator after each impregnation. The resulting $Co[Mo_3(S_2)_6S]/(NH_4)_2[Mo_3(S_2)_6S]$ weighed 54 grams and had a Co/Mo ratio of 1/5.35. Some of this Co probably exists as a separate Co phase as well as Co cation exchanged with the $Mo_3$ material. The catalyst was designated Catalyst D.

Catalyst C and D were subjected to the autoclave test as described in Example 1. The results are given in the Table IV, and comparison made with Catalyst A.

TABLE IV

| Catalyst | Rate Constants/gm of Mo $(Hr)^{-1}$ | | |
|---|---|---|---|
| | MNAP Hydrogenation | HDN | HDS |
| Catalyst A | 0.36 | 0.86 | 0.07 |
| Catalyst C | 0.31 | 0.82 | 0.18 |
| Catalyst D | 0.52 | 1.71 | 0.24 |

These data show that by partial exchange of the $(NH_4)_2[Mo_3S(S_2)_6]$ with cobalt, the HDS activity increased 2.6 fold while a slight decrease in hydrogenation and HDN activity occurred. By adding additional Co using impregnation techniques, the HDS activity was increased 3.4 fold with an attendant increase of 44% and 99% in the hydrogenation and HDN activity, respectively.

EXAMPLE 5

A supported $(NH_4)_2[Mo_3(S_2)_6S]$ catalyst was prepared by synthesizing the material on an alumina support, this catalyst being designated Catalyst E. A sample of commercial grade alumina, of a type used for the preparation of hydrotreating catalysts, was crushed and screened to 100-150 mesh. Then 40.89 gms (33.1 moles) of $(NH_4)_6Mo_7O_{24}.4H_2O$ was dissolved in enough water to make a total of 180 ml of the aqueous solution at 70° C. The freshly prepared hot solution was then impregnated onto the alumina by incipient wetness methods by the method of folded halves. A 200 gm sample of the alumina was used. The resulting material was allowed to dry in air at ambient temperature and pressure for 7 days. A 26.2 gm aliquot of the supported ammonium heptamolybdate was then heated to 85°-90° C. in a sandbath and impregnated by incipient wetness methods with 20 ml of fresh high sulfur ammonium polysulfide solution. The resulting material was held at 85°-90° C. for an additional 16 hours. The catalyst was prepared to contain about 8 wt.% of $(NH_4)_2[Mo_3(S_2)_6S]$, calculated as Mo on an ignition loss free basis.

For comparison with the supported $(NH_4)_2[Mo_3(S_2)_6S]$ catalyst, Catalyst E, a supported $MoO_3$ catalyst precursor material was prepared and designated as Catalyst F. In the preparation of Catalyst F, 241.53 grams of phosphomolybdic acid were dissolved in 741.05 grams of deionized water. The solution was heated and stirred until all of the material dissolved. One thousand grams of a commercial grade alumina used as a support for hydrotreating catalysts were impregnated with this solution and dried in a vacuum oven overnight at 100° C. The material was calcined in air at 540° C. for three hours. The material analyzed 7 wt.% of Mo. In preparation for testing, the sample was ground and sieved to obtain 100-150 mesh material. The material was sulfided in a tube furnace by heating to 150° C. and then passing 10% $H_2S/H_2$ over the catalyst a 1 liter/hr. Heating was continued until 350° C. was reached, and the catalyst was held at this temperature for 6 hours. The sulfided catalyst was subsequently discharged and 5 grams of the catalyst tested in the autoclave unit.

Preparation of Catalyst G: A material identical to Catalyst E, but promoted with Co, was prepared and was designated Catalyst G. This material was prepared by taking a 26.2 gram aliquot of the supported ammonium heptomolybdate and heating it to 85°-90° C. in a sandbath. This material was impregnated by incipient wetness methods with 20.0 ml of fresh high sulfur ammonium polysulfide solution. This material was held at 85°-90° C. for an additional 16 hours. Following this step, the material was then further impregnated at room temperature by incipient wetness methods with 0.55 gm of $Co(CH_3CO_2)_2.7H_2O$ dissolved in 20.0 ml of $H_2O$ with subsequent drying in air at ambient conditions. This catalyst was prepared to contain nominally 2.8 wt.% of cobalt and 8% molybdenum calculated as Co and Mo, respectively.

Catalyst H: For comparison purposes, a commercial hydrotreating catalyst containing the same levels of Co and Mo as Catalyst E was tested in the autoclave after sulfiding as described by reference to the sulfiding of Catalyst E. This catalyst was designated Catalyst H.

Catalyst E, in which $(NH_4)_2[Mo_3(S_2)_6S]$ was synthesized on the surface of an $Al_2O_3$ support, was tested in the autoclave as described in Example 1. In addition, Catalyst F containing Mo on alumina was tested in the autoclave after sulfiding for comparison purposes. Reference is made to Table V which gives the results of these tests. In the table, autoclave test data are also given for Catalyst A the bulk $(NH_4)_2[Mo_3(S_2)_6S]$ material, as a point of reference.

TABLE V

| Catalyst | Rate Constant/gm of Mo $(Hr)^{-1)}$ | | | |
|---|---|---|---|---|
| | MNAP Hydrogenation | HDN | HDS | HDN/HDS |
| A | 0.36 | 0.86 | 0.07 | 12.3 |
| E | 1.41 | 2.55 | 0.33 | 7.7 |
| F | 1.56 | 1.74 | 0.91 | 1.9 |

It is thus shown that by supporting the $(NH_4)_2[Mo_3(S_2)_6S]$ material hydrogenation, HDN and HDS were increased 3.9, 3.0, and 4.7 fold, respectively (Catalyst E vs. Catalyst A). The greatest enhancement occurred in the HDS rate. Thus, the HDN/HDS selectivity ratio was decreased from 12.3 to 7.7 by supporting this material. In comparison, sulfided $MoO_3$ on $Al_2O_3$ (Catalyst F) was only 11% more active for hydrogenation and 32% less active for HDN as compared to Catalyst E. However, Catalyst E was significantly higher in HDS activity compared to Catalyst E (some 2.8 fold higher). As a consequence, the HDN/HDS selectivity ratio was only 1.9. These data clearly show that catalyst sites provided by "on-oil" decomposition of $(NH_4)_2[Mo_3(S_2)_6S]$ on $Al_2O_3$ are quite different from those generated by sulfiding $MoO_3$ on $Al_2O_3$.

Catalyst G, in which $(NH_4)_2[Mo_3(S_2)_6S]$ was synthesized on an $Al_2O_3$ support and thus promoted by Co impregnation, was also tested in the autoclave as described in Example 1. Further, Catalyst H, a commercial Co/Mo on $Al_2O_3$ hydrotreating catalyst, was also tested in the autoclave after sulfiding for comparison purposes. As a point of reference, these data and the results of the autoclave testing of Catalyst D are included in Table V-A. Catalyst D is the Co impregnated $(NH_4)_2[Mo_3(S_2)_6S]$ in bulk form.

TABLE V-A

| Catalyst | Rate Constants/gm of Mo $(Hr)^{-1}$ | | | |
|---|---|---|---|---|
| | MNAP Hydrogenation | HDN | HDS | HDN/HDS |
| D | 0.52 | 1.71 | 0.24 | 9.1 |
| G | 1.18 | 2.92 | 1.56 | 1.9 |
| H | 3.78 | 5.88 | 6.47 | 0.9 |

These data show that by supporting the Co promoted $(NH_4)_2[Mo_3(S_2)_6S]$ material on $Al_2O_3$, the activities for hydrogenation, HDN, and HDS were increased 2.3, 1.7, and 6.5 fold, respectively (Catalyst G vs. Catalyst D). Once again, supporting the material greatly enhanced the HDS rate. Consequently, the HDN/HDS ratio was decreased from 9.1 to 1.9 by supporting the active material on $Al_2O_3$. In addition, Catalyst G was decidedly less active compared to the commercial catalyst (Catalyst H) which showed 3.2, 2.0, and 4.1 fold increase in hydrogenation, HDN, and HDS activity, respectively compared to Catalyst G. At the same time, Catalyst H showed a decrease in HDN/HDS selectivity ratio from 1.9 to 0.9 compared to Catalyst G. Once again, these data show that the catalyst sites provided by "on-oil" decomposition of Co promoted $(NH_4)_2[Mo_3(S_2)_6S]$ on $Al_2O_3$ are quite different from those generated by sulfiding a commercial hydrotreating catalyst.

It is apparent that various modifications and changes can be made without departing the spirit and scope of the invention.

Having described the invention, what is claimed is:

1. A process for the preparation of a new and improved highly active, highly selective hydrotreating catalyst which comprises contacting together and decomposing in the presence of hydrogen, hydrocarbon, and sulfur a catalyst precursor salt characterized by the formula $B_x[Mo_3S_z]$ where B is an ammonium ion, polyammonium ion, or quaternary phosphonium ion, or a hydrocarbyl substituted ammonium ion, hydrocarbyl substituted polyammonium ion, or hydrocarbyl substituted tertiary or quaternary phosphonium ion, x is 1 where B is a divalent cationic moiety, or 2 where B is a monovalent cationic moiety, $[Mo_3S_z]$ is a divalent anionic moiety wherein z is an integer ranging from about 10 to about 46, to form said hydrotreating catalyst.

2. The process of claim 1 wherein the catalyst precursor salt is distended upon a porous inorganic oxide support, and the support contains from about 3 percent to about 20 percent of Mo as the precursor salt, $B_x[Mo_3S_z]$, calculated as Mo on an ignition loss free basis.

3. The process of claim 2 wherein the catalyst contains from about 6 percent to about 17 percent of Mo as said catalyst precursor salt, $B_x[Mo_3S_z]$.

4. The process according to either of claims 2 or 3 wherein the $[Mo_3S_z]$ anionic moiety of the catalyst precursor salt is $Mo_3(S_2)_6S$.

5. The process according to either of claims 2 or 3 wherein the catalyst precursor salt is distended on an alumina support.

6. The process according to any one of claims 2, 3, or 4 wherein the catalyst precursor salt is distended on the support, and the composite contains a promoter metal, or metals, selected from Group VIII of the Periodic Table of the Elements.

7. The process according to any one of claims 2, 3, or 4 wherein the catalyst precursor is distended on the support, and the composite contains a metal selected from molybdenum, tungsten, iron, cobalt, and nickel, alone or in admixture one metal with another, or with other metals.

8. The process according to any one of claims 2, 3, or 4 wherein the catalyst precursor is distended on the support, and the composite contains an admixture of cobalt and molybdenum, or nickel and molybdenum.

9. The process of claim 1 wherein the catalyst precursor is decomposed at temperatures ranging from about 200° C. to about 400° C.

10. The process of claim 9 wherein the temperature ranges from about 250° C. to about 350° C.

11. The process of claim 1 wherein the temperature ranges from about 250° C. to about 350° C.

12. A hydrotreating catalyst prepared by a process which comprises contacting together and decomposing in the presence of hydrogen, hydrocarbon, and sulfur a catalyst precursor salt characterized by the formula $B_x[Mo_3S_z]$ where B is an ammonium ion, polyammonium ion, tertiary or quaternary phosphonium ion, or a hydrocarbyl substituted ammonium ion, hydrocarbyl substituted polyammonium ion, or hydrocarbyl substituted tertiary or quaternary phosphonium ion, x is 1 where B is a divalent cationic moiety, or 2 where B is a monovalent cationic moiety, $[Mo_3S_z]$ is a divalent anionic moiety where Z is an integer ranging from about 10 to about 46.

13. The product of claim 12 wherein the catalyst precursor salt is distended upon a porous inorganic oxide support, and the support contains from about 3 percent to about 20 percent of Mo as the catalyst precursor salt, $B_x[Mo_3S_z]$, calculated as Mo on an ignition loss free basis.

14. The product of claim 13 wherein the catalyst contains from about 6 percent to about 17 percent of Mo as said catalyst precursor salt, $B_x[Mo_3S_z]$.

15. The product according to either of claims 13 or 14 wherein the $[Mo_3S_z]$ anionic moiety of the catalyst precursor salt is $Mo_3(S_2)_6S$.

16. The product according to any one of claims 12, 13, or 14 wherein the catalyst precursor salt is distended on an alumina support.

17. The product according to any one of claims 12, 13, or 14 wherein the catalyst precursor is distended on the support, and the composite contains a promoter metal, or metals, selected from Group VIII of the Periodic Table of the Elements.

18. The product according to any one of claims 13, 14, or 15 wherein the catalyst precursor salt is distended on the support, and the composite contains a metal selected from molybdenum, tungsten, iron, cobalt, and nickel, alone or in admixture one metal with another, or with other metals.

19. The product according to any one of claims 13, 14, or 15 wherein the catalyst precursor salt is distended on the support, and the composite contains an admixture of cobalt and molybdenum, or nickel and molybdenum.

20. The process of claim 12 wherein the catalyst precursor is decomposed at temperatures ranging from about 200° C. to about 400° C.

* * * * *